United States Patent [19]

Tsuchida et al.

[11] Patent Number: 5,282,896
[45] Date of Patent: Feb. 1, 1994

[54] PROCESS FOR PRODUCING PHTHALOCYANINE PIGMENT COMPOSITION CONTAINING HIGHLY HALOGENATED DIFFERENT-METALO-PHTHALOCYANINE

[75] Inventors: Junichi Tsuchida; Masami Shirao; Michichika Hikosaka; Yoshiyuki Nonaka, all of Tokyo, Japan

[73] Assignee: Toyo Ink Manufacturing Co., Ltd., Tokyo, Japan

[21] Appl. No.: 746,404

[22] Filed: Aug. 16, 1991

Related U.S. Application Data

[63] Continuation-in-part of Ser. No. 524,457, May 17, 1990, abandoned.

[30] Foreign Application Priority Data

May 19, 1989 [JP] Japan .................. 1-127699
Sep. 28, 1990 [JP] Japan .................. 2-262827

[51] Int. Cl.$^5$ ............................................. C09B 67/50
[52] U.S. Cl. ............................ 106/411; 540/137; 540/139; 540/140
[58] Field of Search ............... 106/410–413; 540/137, 138, 139, 140

[56] References Cited

U.S. PATENT DOCUMENTS

| | | | |
|---|---|---|---|
| 2,192,704 | 3/1940 | Dahlen et al. | 106/411 |
| 2,247,752 | 6/1941 | Fox | 540/137 |
| 2,713,005 | 7/1955 | Baunsgaard et al. | |
| 2,823,137 | 2/1958 | Pugin | 106/411 |
| 3,004,986 | 10/1961 | Kirby et al. | 106/413 |
| 3,160,635 | 12/1964 | Knudsen et al. | 106/410 |
| 3,332,961 | 7/1967 | Giambalvo | 106/410 |
| 4,067,881 | 1/1978 | Geeran et al. | 540/137 |

FOREIGN PATENT DOCUMENTS 1095430 12/1960 Fed. Rep. of Germany .
1187219 2/1965 Fed. Rep. of Germany .
910137 11/1962 United Kingdom .

OTHER PUBLICATIONS

Chemical Abstract, vol. 102, No. 4, Jan. 1985, p. 102, Abstract No. 26484K.

Primary Examiner—Helene Klemanski
Assistant Examiner—Margaret Einsmann
Attorney, Agent, or Firm—Wenderoth, Lind & Ponack

[57] ABSTRACT

A process for producing a pigment composition containing a highly halogenated copper phthalocyanine, produced by halogenation of copper phthalocyanine in the presence of chlorosulfonic acid, titanium tetrachloride or a mixture of titanium tetrachloride with aluminum chloride, a highly halogenated copper phthalocyanine produced by halogenation of a copper phthalocyanine in a solid powder state, or a highly halogenated copper phthalocyanine produced by cyclization. The composition further contains at least one highly halogenated different-metalo-phthalocyanine selected from highly halogenated metalo-phthalocyanines each of which has Al, Mg, Si, Ti, V, Mn, Fe, Co, Ni, Zn, Ge or Sn as a central metal.

8 Claims, No Drawings

PROCESS FOR PRODUCING PHTHALOCYANINE PIGMENT COMPOSITION CONTAINING HIGHLY HALOGENATED DIFFERENT-METALO-PHTHALOCYANINE

This application is a continuation-in-part application of now abandoned application Ser. No. 07/524,457 filed May 17, 1990.

FIELD OF THE INVENTION

This invention relates to a process for producing a pigment composition containing a highly halogenated copper phthalocyanine widely used as a green pigment, which composition is capable of giving a pigment dispersion having improved use suitabilities, improved fluidity in particular. More specifically, it relates to a process for producing a pigment composition containing a highly halogenated copper phthalocyanine produced by halogenation of copper phthalocyanine in the presence of chlorosulfonic acid, titanium tetrachloride or a mixture of titanium tetrachloride with aluminum chloride, a highly halogenated copper phthalocyanine produced by halogenation of a copper phthalocyanine in a solid powder state, or a highly halogenated copper phthalocyanine produced by cyclization, which composition is capable of giving a pigment dispersion having improved use suitabilities, improved fluidity in particular.

PRIOR ART OF THE INVENTION

Highly halogenated copper phthalocyanine has been widely used as a pigment due to its excellence in color tone and various resistances. However, it is still unsatisfactory for some purposes.

That is, in general, highly halogenated copper phthalocyanine has an extremely fine particle diameter, and it has hence a defect in that it tends to form an aggregate, one of the major defects attributable to the extreme fineness. This tendency is often observed when it is used in a non-aqueous dispersion system such as a coating composition, gravure ink, or the like. Due to the pigment aggregation, the system exhibits a high structural viscosity in fluidity, and sometimes causes problems in practical use, such as gelation, etc.

Meanwhile, in the industrial production of halogenated copper phthalocyanine, the following processes are conventionally known. That is, a process in which the halogenation is carried out in the presence of aluminum chloride-sodium chloride eutectic salt, chlorosulfonic acid, titanium tetrachloride or an organic solvent; a process in which copper phthalocyanine in a solid powder state is halogenated, and a process in which either halogenated phthalimide or halogenated phthalic acid and copper chloride are subjected to a cyclization and condensation reaction. Pigments, which are obtained according to these processes other than the process using aluminum chloride eutectic salt, exhibit particularly high structural viscosity as compared with those obtained by the process using aluminum chloride. Therefore, an improvement in this point has been greatly desired.

Some proposals have been hitherto made in order to overcome the above defects. For example, U.S. Pat. Nos. 3,891,455 and 4,088,507 describe processes in which a blue-colored copper phthalocyanine derivative is mixed with highly halogenated copper phthalocyanine. These processes, however, involve a defect in that the resultant pigment exhibits a bluish tint in hue, although the fluidity of the pigment dispersion system is improved. In order to overcome this defect of bluish tint in hue and achieve excellent gloss and a low viscosity, Japanese Laid-Open Patent Publication No. 168070/1984 and Japanese Patent Publication No. 4143/1965 propose processes in which a halogenated copper phthalocyanine derivative is mixed with highly halogenated copper phthalocyanine. However, the above defect of bluish tint in hue has not yet been satisfactorily overcome.

U.S. Pat. No. 2,247,752 discloses a process for chlorinating copper phthalocyanine in an aluminum chloride-sodium chloride eutectic salt. The highly chlorinated copper phthalocyanine pigment obtained by this process contains highly chlorinated aluminum phthalocyanine as impurities. However, the fluidity thereof has been still insufficient.

SUMMARY OF THE INVENTION

It is an object of this invention to provide a process for producing a pigment composition capable of giving a pigment dispersion having excellent use suitabilities, excellent fluidity in particular.

It is another object of this invention to provide a process for producing a pigment composition capable of giving a pigment dispersion which is free from the bluish tint and has improved fluidity.

It is further another object of this invention to provide a process for producing a pigment composition capable of giving a pigment dispersion having high gloss and high coloring power.

It is still another object of this invention to provide a process for producing a pigment composition capable of giving a pigment dispersion having excellent fluidity even when any one of nonaqueous and aqueous solvent is used.

According to this invention, there is provided a process for producing a pigment composition which comprises the steps of:
(a) producing a highly halogenated copper phthalocyanine in a step selected from the group consisting of the following steps,
- a-1. a step of halogenating copper phthalocyanine in chlorosulfonic acid, titanium tetrachloride or a mixture of titanium tetrachloride with aluminum chloride,
- a-2. a step of halogenating copper phthalocyanine in the state of a solid powder, and
- a-3. a step of cyclizing and condensing either a halogenated phthalimide or halogenated phthalic acid and copper chloride, and (b) adding 0.3 to 30 parts by weight of at least one highly halogenated different-metalo-phthalocyanine selected from highly halogenated metalo-phthalocyanines each of which has Al, Mg, Si, Ti, V, Mn, Fe, Co, Ni, Zn, Ge or Sn as a central metal to 100 parts by weight of the highly halogenated copper phthalocyanine obtained in the step (a).

Further, according to the present invention, there is provided a process for producing a pigment composition, which comprises the steps of:
(a) adding 0.3 to 30 parts by weight of at least one different-metalo-phthalocyanine selected from different-metalo-phthalocyanines each of which has Al, Mg, Si, Ti, V, Mn, Fe, Co, Ni, Zn, Ge or Sn as a central metal to 100 parts by weight of a copper phthalocyanine to prepare a mixture, and (b) subjecting the mixture to halogenation in chlorosulfonic acid, titanium tetrachloride or a mixture of titanium tetrachloride with aluminum chloride, or halogenating the mixture while the mixture is in the state of a solid powder.

DETAILED DESCRIPTION OF THE INVENTION

This invention has been made on the basis of the following finding. That is, a pigment having improved fluidity can be obtained, unexpectedly without impairing the hue, by incorporating a certain amount of a highly halogenated different-metalo-phthalocyanine into a highly halogenated copper phthalocyanine such as that which is prepared by the halogenation of copper phthalocyanine in the presence of a chlorosulfonic acid, titanium tetrachloride or a mixture of titanium tetrachloride with aluminum chloride, by the halogenation of copper phthalocyanine in a solid powder state or by a cyclization-condensation reaction.

The highly halogenated different-metalo-phthalocyanine used in this invention is selected from different-metalo-phthalocyanines having the following formulae (I), (II) and (III).

In the above formulae (I) to (III), each of $M_1$ to $M_3$ a divalent, trivalent or tetravalent central metal, PcXn is a halogenated phthalocyanine moiety in which X is a chlorine or bromine atom and n is an integer of 8 to 16, and each of $R_1$, $R_2$ and $R_3$ is independently —Cl, —OH, —SO$_3$H, or —SO$_3$C$_6$H$_3$(R$_4$)R$_5$ in which each of $R_4$ and $R_5$ is independently an alkyl group having 1 to 18 carbon atoms, a nitro group, a sulfone group or a halogen atom, provided that a combination of $R_2$ and $R_3$ may be one oxygen atom.

The divalent, trivalent or tetravalent central metal, represented by $M_1$ to $M_3$, is selected from Al, Mg, Si, Ti, V, Mn, Fe, Co, Ni, Zn, Ge, Sn, etc. In particular, preferred is a highly halogenated copper phthalocyanine having one of trivalent or tetravalent metal such as Al, V, Ti, Si, Sn, or the like, as a central metal.

$R_1$ to $R_3$ in the formulae (II) and (III) are usually —Cl's just after the highly halogenated different-metalo-phthalocyanine is synthesized, and change to the above-specified groups after post-treatment.

In this invention, the highly halogenated different-metalo-phthalocyanine of each of the formulae (I), (II) and (III) is synthesized, in general, by any one of the following three processes.

The first process is carried out by synthesizing a different-metalo-phthalocyanine and then halogenating the synthesized different-metalo-phthalocyanine according to known processes. The process for the synthesis of different-metalo-phthalocyanine is described, for example, in "The Phthalocyanines" Moser, F. H. and Thomas, A. L., CRS Press Inc., 1983. The halogenation is carried out by a process using an aluminum chloride-sodium chloride eutectic salt as a solvent according to the halogenation process described in U.S. Pat. No. 4,067,881, by a process using chlorosulfonic acid as a solvent as described in U.S. Pat. No. 2,662,085, by a process using titanium tetrachloride as a solvent as described in U.S. Pat. No. 4,998,884.

The second process, which can be only applied to the production of aluminum phthalocyanine, is carried out by dissolving copper phthalocyanine in a hot aluminum chloride-sodium chloride eutectic salt and at the same time, replacing copper, i.e. the central metal, with a different to obtain an aluminum phthalocyanine partially, and then halogenating the mixture of the aluminum phthalocyanine with the copper phthalocyanine.

In the third process, a different-metalo-phthalocyanine is obtained by cyclization and condensation of halogenated phthalimide or halogenated phthalic acid together with a metal. This third process is described in the above-described "The Phthalocyanine" and Japanese Laid-Open Patent Publication No. 16535/1979.

In this invention, the "highly halogenated copper or different-metalo-phthalocyanine" refers to a halogenated copper or different-metalo-phthalocyanine in which at least eight chlorine and/or bromine atoms, preferably not less than 12 chlorine and/or bromine atoms are substituted.

The highly halogenated different-metalo-phthalocyanine and the highly halogenated copper phthalocyanine, which are prepared as described above, can be mixed in the state of dry powder, cake or slurry. These two phthalocyanines may be also mixed with each other when they are treated with concentrated sulfuric acid or some other solvent, or when components for a pigment kneaded with mechanical energy as is done for the formation of usual pigments. Further, the highly halogenated copper phthalocyanine and the highly halogenated different-metalo-phthalocyanine may be prepared separately, and then incorporated when a coating composition, printing ink, etc., are produced.

The amount of the highly halogenated different-metalo-phthalocyanine is 0.3 to 30 parts by weight, preferably 3 to 10 parts by weight based on 100 parts by weight of the highly halogenated copper phthalocyanine. When the amount of the highly halogenated different-metalo-phthalocyanine is less than 0.3 part by weight, the resultant pigment composition does not exhibit any practical effect. When this amount exceeds 30 parts by weight, the alkali resistance, acid resistance and weatherability are reduced. In this connection, if the mixture of the highly halogenated copper phthalocyanine with the highly halogenated different-metalo-phthalocyanine obtained in the second and third processes above is used, it is necessary to determine the different metal replacement ratio in advance, and the resultant hue is less vivid. For these reasons, the first process is advantageous.

Examples of the highly halogenated copper phthalocyanine used in this invention are highly chlorinated copper phthalocyanine, highly brominated copper phthalocyanine, highly chlorinated and brominated phthalocyanine and a mixture of these.

The copper phthalocyanine and a different-metalo-phthalocyanine used in the present invention may be halogenated according to (1) a process using chlorosulfonic acid, (2) a process using titanium tetrachloride as a solvent or (3) process for the halogenation in a solid powder state.

One embodiment of the process using chlorosulfonic acid is described in U.S. Pat. No. 2,662,085, in which phthalocyanine is dissolved in chlorosulfonic acid of which the amount is about 14 times as large as that of the phthalocyanine, and then the temperature of the mixture was elevated stepwise from about 30° C. to about 115° C.

One embodiment of the process using titanium tetrachloride is described in U.S. Pat. No. 4,948,884, in which phthalocyanine is brought into contact with aluminum chloride as a catalyst in a titanium tetrachloride of which the amount is about 5 to 20 times as large as that of the phthalocyanine, and the phthalocyanine is halogenated at a temperature between 100° C. and 137° C.

One embodiment of the process for the halogenation in a solid powder state is described in Japanese Laid-Open Patent Publication No. 16535/1979, in which phthalocyanine is mixed with an alkali metal halide powder of which the amount is about 10 times larger than that of the phthalocyanine, and the phthalocyanine is halogenated at a temperature between 180° C. and 400° C.

The highly halogenated copper phthalocyanine and the highly halogenated different-metalo-phthalocyanine can be also obtained by a cyclization and condensation reaction of halogenated phthalimide as described in Japanese Laid-Open Patent Publication No. 16535/1979.

In the present invention, the following process may be employed, in which 100 parts by weight of a copper phthalocyanine and 0.3 to 30 parts by weight of a different-metalo-phthalocyanine are preliminarily mixed, and then the resultant mixture is halogenated according to any one of the above methods (1) to (3).

In this invention, the fluidity of a suspension of highly halogenated copper phthalocyanine is improved. The highly halogenated different-metalo-phthalocyanine may be added to a pigment dispersion at any them before, during and after the preparation of the pigment dispersion. The amount of the highly halogenated different-metalo-phthalocyanine per 100 parts by weight of the highly halogenated copper phthalocyanine is 0.3 to 30 parts by weight.

Examples of the pigment dispersion of this invention are a coating composition, printing ink, etc.

The coating composition referred to in this invention comprises 0.1 to 15% by weight of the pigment composition obtained according to the process of this invention, 99.9 to 55% by weight of a vehicle for the coating composition and 0 to 30% by weight of other auxiliary and a loading pigment. The vehicle for the coating composition comprises 80 to 20% by weight of an acrylic resin, alkyd resin, epoxy resin, chlorinated rubber, vinyl chloride, synthetic resin emulsion, silicone resin, water-soluble resin, polyurethane, polyester, melamine resin, urea resin or a mixture of these and 60 to 10% by weight of a solvent such as a hydrocarbon, alcohol, ketone, ether alcohol, ether, ester or water.

A gravure ink is formed by mixing 3 to 20% by weight of the pigment composition obtained according to the process of this invention, 97 to 60% by weight of a vehicle for the gravure ink and 0 to 20% by weight of other auxiliary and a loading pigment. The vehicle for the gravure ink comprises 10 to 50% by weight of a gum rosin, wood rosin, tail rosin, lime rosin, rosin ester, maleic acid resin, polyamide resin, vinyl resin, nitrocellulose, cellulose acetate, ethyl cellulose, ethylene-vinyl acetate copolymer resin, urethane resin, polyester resin, alkyd resin, gilsonite, dammar, shellac, or a mixture of these and 30 to 80% by weight of a solvent such as a hydrocarbon, alcohol, ketone, ether alcohol, ether, ester or water.

An offset printing ink is formed by mixing 3 to 35% by weight of the pigment composition obtained according to the process of this invention, 97 to 45% by weight of a vehicle for the offset printing ink and 0 to 20% by weight of other auxiliary and a loading pigment. The vehicle for the offset printing ink comprises 20 to 50% by weight of a rosin-modified phenolic resin, petroleum resin alkyd resin or resin prepared by modifying these resins with dry oil, 0 to 30% by weight of a plant oil such as linseed oil, tung oil, soybean oil, or the like, and 10 to 60% by weight of a solvent such as n-paraffin, isoparaffin, aromatic, naphthene, α-olefin, or the like.

In the pigment composition obtained according to the process of this invention, the fluidity is improved by incorporating an inherently green halogenated different-metalo-phthalocyanine instead of incorporating a blue phthalocyanine derivative. Therefore, the pigment composition of this invention is free from the defect that it is with a bluish tint.

Further, the pigment dispersion obtained according to the process of this invention not only exhibits excellent fluidity derived from a decrease in structural viscosity but also has high gloss and high pigmenting power. Furthermore, the pigment dispersion of this invention is usable with each of a nonaqueous vehicle and an aqueous vehicle, and maintains the above effect in a wide viscosity range of the dispersion. Therefore, the pigment composition of this invention is usable widely in almost all coating compositions, printing inks, and the like.

EXAMPLES

This invention will be explained further in detail by reference to Preparation Examples, Examples and Comparative Examples, in which "part" stands for "part by weight" and "%" for "% by weight".

PREPARATION EXAMPLE 1

128 Parts of phthalodinitrile, 37 parts of aluminum chloride and 1 part of ammonium molybdate were mixed in a mixing machine, and the resultant mixture was charged into a reactor. The mixture was allowed to react by heating it to 210° C., whereby a crude aluminum phthalocyanine was synthesized. Then, 200 parts of aluminum chloride and 40 parts of sodium chloride were heated to form a eutectic salt having a temperature of 170° C. And, 40 parts of the crude aluminum phthalocyanine, which was pulverized, was added, and a chlorine gas was introduced at a rate of 10 parts per hour for 10 hours. After the chlorination, a large amount of water was charged, the resultant mixture was filtered, and the remaining solid was washed with water, dried and pulverized to give 59 parts of a crude highly chlorinated aluminum phthalocyanine [$R_1$ in the formula (I) is —Cl].

The crude highly chlorinated aluminum phthalocyanine had an average chlorination ratio of 14.0 atoms.

PREPARATION EXAMPLE 2

200 Parts of aluminum chloride and 40 parts of sodium chloride were heated to form a eutectic salt having a temperature of 200° C. Then, 40 parts of a crude copper phthalocyanine was charged, and then, the mixture was cooled to 170° C. Bromine was introduced at a rate of 2 parts per hour for 60 hours, and further, a chlorine gas was introduced at a rate of 4 parts per hour for 8 hours. After the reaction of these was finished, a large amount of water was charged. And, the mixture was filtered, and the remaining solid was washed with water, dried and pulverized to give 55 parts of a crude highly chlorinated and brominated aluminum phthalocyanine-copper phthalocyanine mixture [R1 in the formula (I) is —Cl].

The crude highly chlorinated and brominated aluminum phthalocyanine-copper phthalocyanine mixture had an aluminum substitution ratio of 29%, a chlorination ratio of 8.2 atoms and a bromination ratio of 4.6 atoms.

PREPARATION EXAMPLE 3

60 Parts of a paste of a crude highly chlorinated aluminum phthalocyanine prepared in the same way as in Preparation Example 1 was dispersed in 800 parts of a 5% NaOH aqueous solution, and the dispersion was stirred at 80° C. for 1 hour. Then, the dispersion was filtered, and the remaining solid was washed with water, dried and pulverized [R1 in the formula (I) is —OH].

PREPARATION EXAMPLE 4

10 Parts of a crude highly chlorinated aluminum phthalocyanine prepared in the same way as in Preparation Example 1 and 2 parts of p-chlorobenzene sulfonic acid were dissolved in 150 parts of 99% sulfuric acid, and the mixture was stirred at 50° C. for 2 hours. The reaction mixture was run into a large amount of water, the resultant mixture was filtered, and the remaining solid was washed with water, dried and pulverized [R1 in the formula (I) is —SO$_3$C$_6$H$_4$Cl].

PREPARATION EXAMPLE 5

10 Parts of a crude highly chlorinated aluminum phthalocyanine prepared in the same way as in Preparation Example 1 and 2 parts of laurylbenzene sulfonic acid were dissolved in 150 parts of 99% sulfuric acid, and the mixture was stirred at 50° C. for 2 hours. The reaction mixture was run into a large amount of water, the resultant mixture was filtered, and the remaining solid was washed with water, dried and pulverized [R1 in the formula (I) is —SO$_3$C$_6$H$_4$C$_{12}$H$_{25}$].

PREPARATION EXAMPLE 6

128 Parts of phthalodinitrile, 41 parts of ferric chloride and 1 part of ammonium molybdate were mixed with a mixer, and charged into a reactor. The mixture was heated to 210° C. and allowed to react to synthesize a crude iron phthalocyanine. The crude iron phthalocyanine was milled. Then, 200 parts of aluminum chloride and 40 parts of sodium chloride were heated to prepare a eutectic salt having a temperature of 120° C., and 40 parts of the milled crude iron phthalocyanine was added to the eutectic salt, and the resultant mixture was stirred for 30 minutes. And, the crude iron phthalocyanine was chlorinated by elevating the temperature of the mixture up to 160° C. and introducing chlorine gas at a rate of 8 parts/hour for 14 hours. After the chlorination, the mixture was poured into a large amount of water and filtered, and the remainder was washed with water, dried and milled to give 53 parts of a crude highly chlorinated iron phthalocyanine. The resultant crude highly chlorinated iron phthalocyanine had an average chlorination ratio, per iron phthalocyanine molecule, of 14.2 atoms.

PREPARATION EXAMPLE 7

10 Parts of the same crude highly chlorinated iron phthalocyanine as that obtained in Preparation Example 6 was dispersed in 100 parts of a 5% NaOH aqueous solution, and the dispersion was stirred at 80° C. for 1 hour. Then, the dispersion was filtered, and the remainder was washed with water, dried and milled.

PREPARATION EXAMPLE 8

10 Parts of the same crude highly chlorinated iron phthalocyanine as that obtained in Preparation Example 6 and 2 parts of p-chlorobenzenesulfonic acid were dissolved in 150 parts of 99% sulfuric acid, and the mixture was stirred at 50° C. for 2 hours and then poured into a large amount of water. The mixture was filtered, and the remainder was washed with water, dried and milled.

PREPARATION EXAMPLE 9

300 Parts of Hisol P (supplied by Nippon Oil Co., Ltd.), 128 parts of phthalodinitrile, 48 parts of titanium tetrachloride and 2 parts of pyridine were charged into a reactor, and the mixture was heated to 200° C. to allow it to react. And, the reaction mixture was filtered, and the remainder was dried and milled to prepare a crude titanium phthalocyanine. Thereafter, 200 parts of aluminum chloride and 40 parts of sodium chloride were heated to prepare a eutectic salt having a temperature of 120° C. And, 40 parts of the crude titanium phthalocyanine was added to the eutectic salt and the mixture was stirred for 30 minutes. The crude titanium phthalocyanine was chlorinated by elevating the temperature of the mixture up to 160° C. and introducing chlorine gas at a rate of 8 parts/hour for 14 hours. After the chlorination, the mixture was poured into a large amount of water. The mixture was filtered, and the remainder was washed with water, dried and milled to give a crude highly chlorinated titanium phthalocyanine.

PREPARATION EXAMPLE 10

Preparation Example 9 was repeated except that 48 parts of the titanium tetrachloride was replaced with 66 parts of stannic chloride, whereby a crude highly chlorinated phthalocyanine was obtained.

PREPARATION EXAMPLE 11

Preparation Example 6 was repeated except that 41 parts of the ferric chloride was replaced with 51 parts of nickel chloride, whereby a crude highly chlorinated nickel phthalocyanine was obtained.

In order to evaluate the pigment composition of this invention, coating compositions and gravure inks having the following formulations were prepared.

| Formulation 1 (Oil coating composition) | |
| --- | --- |
| Pigment (pigment composition) | 7 parts |
| Alkyd resin varnish | 56 parts |
| Melamine resin varnish | 28 parts |
| Thinner | 12 parts |
| Formulation 2 (Water-soluble resin coating composition) | |
| Pigment (pigment composition) | 6 parts |
| Water-soluble acrylic resin varnish | 55 parts |
| Melamine resin varnish | 9 parts |
| Thinner | 30 parts |
| Formulation 3 (gravure ink) | |
| Pigment (pigment composition) | 10 parts |

| | |
|---|---|
| Polyamide%nitrocellulose varnish | 70 parts |
| Thinner | 20 parts |

In the following Examples and Comparative Examples, the above formulations were respectively charged into containers with steel balls or glass beads and dispersed with a paint shaker to form coating compositions and gravure inks.

Pigment compositions prepared in Examples and Comparative Examples were evaluated as follows.

(1) Evaluation of fluidity

The viscosities of pigment dispersions prepared in Examples and Comparative Examples were measured by using a Brookfield viscometer at 6 rpm and 60 rpm.

(2) Evaluation of gloss

The oil coating compositions were adjusted with a thinner so as to have a viscosity, measured with a Ford cup No. 4, of 23 seconds. And, they were sprayed onto tin-plated steel sheets and baked. The gravure inks were spread on a triacetate film by means of a bar coater. Then, the resultant films of the coating compositions or the gravure inks were measured for a gloss at 60 degrees by using a glossmeter.

COMPARATIVE EXAMPLE 1

800 Parts of titanium tetrachloride, 40 parts of a crude copper phthalocyanine and 37.2 parts of aluminum chloride (4 times by mole as large as the amount of phthalocyanine) were charged into a reactor. The temperature inside the reactor was elevated, with stirring, to 110°-115° C. over about 30 minutes, and this temperature was maintained for 3 hours with stirring continuously. Thereafter, the temperature was elevated to 135°-137° C. And, a chlorine gas was introduced at a rate of 5 parts per hour for 25 hours, and titanium tetrachloride was distilled off. The distillation residue (magma) was treated with hydrochloric acid, and heated, with stirring, to 70°-80° C. to form a slurry. The slurry was filtered, and the remaining solid was washed with water and dried to give 72.3 parts of a highly chlorinated copper phthalocyanine having a green color. The highly chlorinated copper phthalocyanine had a average chlorination ratio, per copper phthalocyanine molecule, of 14.6 atoms. 100 Parts of the highly chlorinated copper phthalocyanine, 300 parts of sodium chloride and 140 parts of diethylene glycol were mixed in a kneader over 6 hours to give a pigment composition. The pigment composition was formulated into a coating composition as per Formulation 1. Table 1 shows the fluidity and gloss of the coating composition.

EXAMPLE 1

97 Parts of the same highly chlorinated copper phthalocyanine pigment composition as that obtained in Comparative Example 1 and 3 parts of the highly chlorinated aluminum phthalocyanine prepared in Prepuration Example 1 were formulated into a coating composition as per Formulation 1. Table 1 shows the evaluation results of the coating composition, which had excellent fluidity and gloss over the coating composition obtained in Comparative Example 1.

EXAMPLES 2-4

97 Parts of the same highly chlorinated copper phthalocyanine pigment composition as that obtained in Comparative Example 1 and 3 parts of the highly chlorinated aluminum phthalocyanine prepared in Preparation Example 3 (for Example 2), Preparation Example 4 (for Example 3) or Preparation Example 5 (for Example 4) were formulated into a coating composition as per Formulation 1. Table 1 shows the evaluation results of these coating compositions. All of the coating compositions had excellent fluidity and gloss over the coating composition obtained in Comparative Example 1.

COMPARATIVE EXAMPLE 2

3.0 Parts of copper phthalocyanine is mixed with 41 parts of chlorosulfonic acid while the resulting mixture was stirred. 5 Parts of sulfur monochloride and 0.3 part of iodine monochloride were added. A chlorine gas was bubbled through this mixture solution at 30° C. When the olive color of the starting solution changed to carmine red, the reaction mass was heated slowly to 90° C. The bubbling of the chlorine gas was stopped when a desired chlorination degree was obtained, as evidenced by drowning small batch samples into water on a porcelain plate and observing the degree of greenness of shade of the isolated product. Heating was continued for one hour, and the reaction mass was run slowly into 410 parts of cold water at room temperature, whereby a clean green chlorinated phthalocyanine pigment precipitated. The resultant mixture was filtered, and the remaining solid was washed with water and dried to give a crude highly chlorinated copper phthalocyanine containing 14.3 chlorine atoms per copper phthalocyanine molecule.

100 Parts of the crude highly chlorinated copper phthalocyanine was formed into a pigment composition in the same manner as in Comparative Example 1, and the pigment composition was formulated into a coating composition as per Formulation 1.

EXAMPLE 5

89.6 Parts of a crude highly chlorinated copper phthalocyanine synthesized by using chlorosulfonic acid as a solvent and 10.4 parts of the crude highly chlorinated and brominated aluminum phthalocyanine-copper phthalocyanine mixture prepared in Preparation Example 2 (a mixture containing 3 parts of highly chlorinated and brominated aluminum phthalocyanine) were formed into a pigment composition in the same way as in Comparative Example 1, and the pigment composition was formulated into a coating composition as per Formulation 1. Table 1 shows the evaluation results of the coating composition, which had excellent fluidity and gloss over the coating composition obtained in Comparative Example 2.

COMPARATIVE EXAMPLE 3

150 Parts of a crude copper phthalocyanine and 1,500 parts of a sodium chloride powder were charged into a rotary furnace reactor, and a chlorine gas was introduced. At first, the copper phthalocyanine was chlorinated at 240° for 3 hours. Then, 10 parts of an iron powder was added, and the reaction temperature was elevated at a rate of 10° C. every 15 minutes while chlorine was introduced. And, when the reaction temperature became 280° C., the reaction was further continued for 1 hour. After the reaction was finished, the temperature was decreased, and the reaction mixture was run into water to separate sodium chloride. Then, the reaction product was washed with a 3% hydrochloric acid water solution and a 3% sodium hydroxide water solution to remove the catalyst and impurities, washed with water, and dried to give a yellowish green highly chlorinated copper phthalocyanine. Chlorine analysis showed that this highly chlorinated copper phthalocyanine had 15.0 chlorine atoms introduced per phthalocyanine molecule.

The highly chlorinated copper phthalocyanine was formed into a pigment composition in the same way as in Comparative Example 1, and the pigment composition was formulated into an aqueous coating composition as per Formulation 2. The fluidity of the aqueous coating composition was examined. Table 2 shows the result.

EXAMPLE 6

A pigment composition composed of 93 parts of the same pigment composition as that obtained in Comparative Example 3 and 7 parts of the pigment prepared in Preparation Example 1 was formulated into a coating composition as per Formulation 2.

Table 2 shows the evaluation result of the coating composition, which had excellent fluidity over the coating composition obtained in Comparative Example 3.

COMPARATIVE EXAMPLE 4

140 Parts of urea, 100 parts of tetrachlorophthalic anhydride and 16 parts of copper sulfate (II) in 800 parts of trichlorobenzene were heated to 85° to 90° C. While this temperature was maintained, a mixture of 6 parts of titanium tetrachloride with 20 parts of sulfuryl chloride was added dropwise. The resultant reaction mixture was stirred at 85° to 90° C. for 1 hour, and then heated to 190° C. over 3 hours. The reaction mixture was stirred at 190° C. for 2 hours, and then cooled to 150° C. At this temperature, the reaction mixture was filtered with suction. The resultant crude highly chlorinated copper phthalocyanine was formed into a pigment composition in the same way as in Comparative Example 1. The pigment composition was formulated into a water-soluble coating composition as per Formulation 2, and the fluidity thereof was measured.

Table 2 shows the result.

EXAMPLE 7

A pigment composition composed of 93 parts of the same pigment composition as that obtained in Comparative Example 4 and 7 parts of the pigment prepared in Preparation Example 1 was formulated into a coating composition as per Formulation 2.

Table 2 shows the evaluation result of the coating composition, which had excellent fluidity over the coating composition obtained in Comparative Example 4.

EXAMPLE 8

A pigment composition composed of 75.7 parts of the same pigment composition as that obtained in Comparative Example 4 and 23.1 parts of the pigment (containing 7 parts of highly chlorinated and brominated aluminum phthalocyanine) prepared in Preparation Example 2 was formulated into a coating composition as per Formulation 2.

Table 2 shows the evaluation result of the coating composition, which had excellent fluidity over the coating composition obtained in Comparative Example 4.

COMPARATIVE EXAMPLE 5

The same pigment composition as that obtained in Comparative Example 1 was formulated into a gravure ink as per Formulation 3.

Table 3 shows the evaluation results of the resultant gravure ink.

EXAMPLES 9 AND 10

A pigment composition composed of 96 parts of the same pigment composition obtained in Comparative Example 5 and 4 parts of the pigment prepared in Preparation Example 1 (for Example 9) or Preparation Example 4 (for Example 10) was formulated into a gravure ink as per Formulation 3.

Table 3 shows the evaluation results of the gravure inks obtained above.

Both these two gravure inks had excellent fluidity and excellent gloss over the gravure ink obtained in Comparative Example 5.

EXAMPLE 11

A pigment composition composed of 86.1 parts of the pigment composition obtained in Comparative Example 5 and 13.9 parts of the pigment (containing 4 parts of highly chlorinated and brominated aluminum phthalocyanine) prepared in Preparation Example 2 was formulated into a gravure ink as per Formulation 3.

Table 3 shows the evaluation results of the gravure ink, which had excellent fluidity and excellent gloss over the gravure ink obtained in Comparative Example 5.

TABLE 1

Evaluation of oil coating compositions (Formulation 1)

| Example & Comparative Example | Preparation Process for Matrix Pigment | Aluminum Phthalocyanine | | | Viscosity 6 rpm/60 rpm | Gloss at 60° |
|---|---|---|---|---|---|---|
| | | Prep. Example | $R_1$ | Amount | | |
| C. Ex. 1 | Titanium tetrachloride process | — | — | —% | 5040/1250 | 78 |
| Ex. 1 | Titanium tetrachloride process | 1 | —Cl | 3 | 1480/800 | 92 |
| Ex. 2 | Titanium tetrachloride process | 3 | —OH | 3 | 1640/850 | 90 |
| Ex. 3 | Titanium tetrachloride process | 4 | —SO$_3$C$_6$H$_4$Cl | 3 | 2480/1090 | 85 |
| Ex. 4 | Titanium tetrachloride process | 5 | —SO$_3$C$_6$H$_4$C$_{12}$H$_{25}$ | 3 | 2060/1010 | 86 |
| C. Ex. 2 | Chlorosulfonic acid process | — | — | — | 6170/1320 | 79 |
| Ex. 5 | Chlorosulfonic acid process | 2 | —Cl | 3* | 2530/1140 | 88 |

Note:
*Amount of aluminum phthalocyanine in a mixture.

TABLE 2

Evaluation of water-soluble coating compositions (Formulation 2)

| Example & Comparative Example | Preparation Process for Matrix Pigment | Aluminum Phthalocyanine Prep. Example | $R_1$ | Amount | Viscosity 6 rpm/60 rpm |
|---|---|---|---|---|---|
| C. Ex. 3 | Solid phase process | — | — | —% | 5780/2310 |
| Ex. 6 | Solid phase process | 1 | —Cl | 7 | 2620/1900 |
| C. Ex. 4 | Cyclization-condensation process | — | — | — | 6030/2500 |
| Ex. 7 | Cyclization-condensation process | 1 | —Cl | 7 | 2080/1710 |
| Ex. 8 | Cyclization-condensation process | 2 | —Cl | 7* | 2470/1850 |

Note:
*Amount of aluminum phthalocyanine in a mixture.

TABLE 3

Evaluation of gravure inks (Formulation 3)

| Example & Comparative Example | Preparation Process for Matrix Pigment | Aluminum Phthalocyanine Prep. Example | $R_1$ | Amount | Viscosity 6 rpm/60 rpm | Gloss at 60° |
|---|---|---|---|---|---|---|
| C. Ex. 5 | Titanium tetrachloride process | — | — | —% | 7090/1530 | 57 |
| Ex. 9 | Titanium tetrachloride process | 1 | —Cl | 4 | 4740/1120 | 63 |
| Ex. 10 | Titanium tetrachloride process | 4 | —$SO_3C_6H_4Cl$ | 4 | 5360/1180 | 59 |
| Ex. 11 | Titanium tetrachloride process | 2 | —Cl | 4* | 5430/1145 | 60 |

Note:
*Amount of aluminum phthalocyanine in a mixture.

EXAMPLE 12

A pigment composition composed of 97 parts of the highly chlorinated copper phthalocyanine obtained in Comparative Example 2 and 3 parts of the highly chlorinated iron phthalocyanine obtained in Preparation Example 6 was formulated into a coating composition as per Formulation 1. As shown in Table 4, the resultant coating composition was excellent in fluidity and gloss over that obtained in Comparative Example 2.

EXAMPLES 13–15

A pigment composition composed of 97 parts of the highly chlorinated copper phthalocyanine obtained in Comparative Example 1 and 3 parts of the highly chlorinated different methalo-phthalocyanine obtained in Preparation Example 7 (for Example 13), Preparation Example 8 (for Example 14) or Preparation Example 9 (for Example 15) was formulated into a coating composition as per Formulation 1. As shown in Table 4, the resultant coating compositions were excellent in fluidity and gloss over that obtained in Comparative Example 2.

EXAMPLE 16

128 Parts of phthalodinitrile, 41 parts of ferric chloride and 1 part of ammonium molybdate were mixed, and the mixture was charged into a reactor and allowed to react at 210° C. The resultant reaction product was milled to give a crude iron phthalocyanine.

5 Parts of the above crude iron phthalocyanine, 95 parts of crude copper phthalocyanine, 100 parts of aluminum chloride and 20,000 parts of titanium tetrachloride were charged into a reactor, and the mixture was stirred at 130° to 135° C. for 4 hours, and thereafter, chlorine gas was introduced at a rate of 10 parts/hour for 24 hours. After the reaction, titanium tetrachloride was distilled off, and 3% hydrochloric acid was poured on the remaining magma to dissolve the magma, whereby a pigment slurry was obtained. The slurry was filtered, and the remainder was washed with water and dried to give a crude green pigment.

The above crude green pigment was formed into a pigment composition in the same manner as in Comparative Example 2, and the pigment composition was formulated into a coating composition as per Formulation 1. Table 4 shows the fluidity of the coating composition.

COMPARATIVE EXAMPLE 6

The highly chlorinated copper phthalocyanine pigment obtained in Comparative Example 1 was formulated into a coating composition as per Formulation 2. Table 5 shows the fluidity of the coating composition.

EXAMPLES 17–21

A pigment composition composed of 93 parts of the highly chlorinated copper phthalocyanine obtained in Comparative Example 1 and 7 parts of the highly chlorinated different-metalo-phthalocyanine obtained in Preparation Example 6 (for Example 17), Preparation Example 7 (for Example 18), Preparation Example 10 (for Example 19), Preparation Example 11 (for Example 20) or Preparation Example 9 (for Example 21) was formulated into a coating composition as per Formulation 2. As shown in Table 5, the resultant coating compositions has excellent fluidity over the coating composition obtained in Comparative Example 6.

COMPARATIVE EXAMPLE 7

The pigment obtained in Comparative Example 2 was formulated into a gravure ink as per Formulation 3, and the gravure ink was evaluated. Table 6 shows the results.

EXAMPLES 22–25

A pigment composition composed of 96 parts of the highly chlorinated copper phthalocyanine pigment obtained in Comparative Example 2 and 4 parts of the highly chlorinated different-metalo-phthalocyanine obtained in Preparation Example 6 (for Example 22), Preparation Example 9 (for Example 23), Preparation Example 10 (for Example 24) or Preparation Example 11 (for Example 25) was formulated into a gravure ink as per Formulation 3. The resultant gravure inks were evaluated. As shown in Table 6, the gravure inks were excellent in fluidity and gloss over that obtained in Comparative Example 7.

COMPARATIVE EXAMPLE 8

A highly chlorinated copper phthalocyanine pigment (trade name, Lionol Green Y-102, manufactured by Applicant Company) obtained by chlorination of copper phthalocyanine in an aluminum chloride/sodium chloride eutectic salt was formulated into an oil coating composition as per Formulation described below. In addition, the above highly chlorinated copper phthalocyanine pigment contained 12% by weight of highly chlorinated aluminum phthalocyanine as a by-product.

The above oil coating composition was measured with a Brookfield viscometer for a viscosity to show 2,100/655 (6 rpm/6 rpm).

| Formulation | |
|---|---|
| Pigment | 7 parts |
| Alkyd resin | 56 parts |
| Melamine resin | 28 parts |
| Xylene | 12 parts |

EXAMPLE 26

A pigment composition composed of 95 parts of the highly chlorinated copper phthalocyanine obtained in Comparative Example 1 and 5 parts of the highly chlorinated aluminum phthalocyanine obtained in Preparation Example 1 was formulated into a coating composition as per Formulation described in Comparative Example 8.

The resultant coating composition showed a viscosity of 309/195 (6 rpm/60 rpm), and thus had excellent fluidity and clearness over the coating composition obtained in Comparative Example 8.

TABLE 4

Evaluation of oil coating compositions (formulation 1)

| Example & Comparative Example | Preparation process for matrix pigment | Different-metalo-phthalocyanine Prep. Exam. | Central metal | R | Amount | Viscosity 6 rpm/60 rpm | Gloss at 60° |
|---|---|---|---|---|---|---|---|
| C. Ex. 2 | Chlorosulfonic acid process | — | — | — | —% | 6,170/1,320 | 79 |
| Ex. 12 | Chlorosulfonic acid process | 6 | Fe | —Cl | 3 | 380/275 | 90 |
| Ex. 13 | Chlorosulfonic acid process | 7 | Fe | —OH | 3 | 540/360 | 85 |
| Ex. 14 | Chlorosulfonic acid process | 8 | Fe | $-SO_3C_6H_4Cl$ | 3 | 580/390 | 84 |
| Ex. 15 | Chlorosulfonic acid process | 9 | Ti | $-Cl_2$ | 3 | 420/320 | 89 |
| Ex. 16 | Titanium tetrachloride process | — | Fe | —Cl | 5 | 410/300 | 87 |

TABLE 5

Evaluation on water-soluble coating compositions (formulation 2)

| Example & Comparative Example | Preparation process for matrix pigment | Different-metalo-phthalocyanine Preparation Example | Central metal | R | Amount | Viscosity 6 rpm/60 rpm |
|---|---|---|---|---|---|---|
| C. Ex. 6 | Titanium tetrachloride process | — | — | — | —% | 6,230/2,730 |
| Ex. 17 | Titanium tetrachloride process | 6 | Fe | —Cl | 7 | 2,590/1,920 |
| Ex. 18 | Titanium tetrachloride process | 7 | Fe | —OH | 7 | 2,730/2,260 |
| Ex. 19 | Titanium tetrachloride process | 10 | Sn | $-Cl_2$ | 7 | 2,830/2,390 |
| Ex. 20 | Titanium tetrachloride process | 11 | Ni | — | 7 | 3,310/2,510 |
| Ex. 21 | Titanium tetrachloride process | 9 | Ti | $-Cl_2$ | 7 | 2,610/2,080 |

TABLE 6

Evaluation on gravure inks (Formulation 3)

| Example & Comparative Example | Preparation process for matrix pigment | Different-metalo-phthalocyanine Prep. Exam. | Central metal | R | Amount | Viscosity 6 rpm/60 rpm | Gloss at 60° |
|---|---|---|---|---|---|---|---|
| C. Ex. 7 | Chlorosulfonic acid process | — | — | — | —% | 6,820/1,630 | 55 |
| Ex. 22 | Chlorosulfonic acid process | 6 | Fe | —Cl | 4 | 3,980/970 | 62 |
| Ex. 23 | Chlorosulfonic acid process | 9 | Ti | $-Cl_2$ | 4 | 4,130/990 | 60 |
| Ex. 24 | Chlorosulfonic acid process | 10 | Sn | $-Cl_2$ | 4 | 4,560/1,090 | 59 |
| Ex. 25 | Chlorosulfonic acid process | 11 | Ni | — | 4 | 4,820/1,120 | 59 |

What is claimed is:

1. A process for producing a pigment composition which comprises the steps of:
   (a) preparing a highly halogenated copper phthalocyanine in any one of the following steps,
      a-1. a step of halogenating copper phthalocyanine in chlorosulfonic acid, titanium tetrachloride or a mixture of titanium tetrachloride with aluminum chloride,
      a-2. a step of halogenating copper phthalocyanine in the state of a solid powder, and
      a-3. a step of cyclizing and condensing either a halogenated phthalimide or halogenated phthalic acid and copper chloride, and
   (b) adding 0.3 to 30 parts by weight of at least one highly halogenated different-metalo-phthalocyanine selected from highly halogenated metalo-phthalocyanines each of which has Al, Mg, Si, Ti, V, Mn, Fe, Co, Ni, Zn, Ge or Sn as a central metal to 100 parts by weight of the highly halogenated copper phthalocyanine obtained in the step (a).

2. A process according to claim 1, wherein the different-metalo-phthalocyanine is a compound of the formula (I), (II) or (III), $$M_1PcX_n \qquad (I)$$

$$R_1-M_2PcX_n \qquad (II)$$

$$R_2R_3-M_3PcX_n \qquad (III)$$

wherein PcXn is a halogenated phthalocyanine moiety in which X is a chlorine or bromine atom and n is an integer of 8 to 16, each of $M_1$ to $M_3$ is a divalent, trivalent or tetravalent central metal selected from Al, Mg, Si, Ti, V, Mn, Fe, Co, Ni, Zn, Ge or Sn, and each of $R_1$, $R_2$ and $R_3$ is independently —Cl, —OH, —$SO_3H$, or —$SO_3C_6H_3(R_4)R_5$ in which each of $R_4$ and $R_5$ is independently an alkyl group having 1 to 18 carbon atoms, a nitro group, a sulfone group or a halogen atom, provided that a combination of $R_2$ and $R_3$ may represent one oxygen atom.

3. A process according to claim 1, wherein the highly halogenated copper phthalocyanine is at least one member selected from the group consisting of highly chlorinated copper phthalocyanine, highly brominated copper phthalocyanine and highly chlorinated and brominated copper phthalocyanine.

4. A process according to claim 1, wherein the highly halogenated copper phthalocyanine has at least 8 halogen atoms on a phthalocyanine moiety.

5. A process according to claim 1, wherein the highly halogenated different-metalo-phthalocyanine has at least 8 halogen atoms on a phthalocyanine moiety.

6. A pigment dispersion having improved fluidity, which is prepared by dispersing the pigment produced by the process recited in claim 1 in a dispersion vehicle.

7. A pigment dispersion according to claim 6, which is a coating composition.

8. A pigment dispersion according to claim 6, which is a printing ink.

* * * * *